(12) United States Patent
Hatano et al.

(10) Patent No.: US 7,600,920 B2
(45) Date of Patent: Oct. 13, 2009

(54) BEARING HOLDING STRUCTURE FOR MOTOR

(75) Inventors: Kenta Hatano, Tokyo (JP); Sotsuo Miyoshi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 493 days.

(21) Appl. No.: 10/567,121

(22) PCT Filed: Mar. 10, 2005

(86) PCT No.: PCT/JP2005/004237

§ 371 (c)(1),
(2), (4) Date: Feb. 3, 2006

(87) PCT Pub. No.: WO2005/124970

PCT Pub. Date: Dec. 29, 2005

(65) Prior Publication Data

US 2008/0247694 A1    Oct. 9, 2008

(30) Foreign Application Priority Data

Jun. 15, 2004    (JP) .............................. 2004-177034

(51) Int. Cl.
*F16C 35/00*    (2006.01)
(52) U.S. Cl. ........................................ 384/428; 310/91
(58) Field of Classification Search ................. 384/428; 310/91; *F16C 35/00*
See application file for complete search history.

(56) References Cited

U.S. PATENT DOCUMENTS

| | | | | |
|---|---|---|---|---|
| 1,772,778 A | * | 8/1930 | Magnuson | 403/258 |
| 3,777,195 A | * | 12/1973 | Potter | 310/91 |
| 4,048,530 A | * | 9/1977 | Kaufman, Jr. | 310/89 |
| 4,938,614 A | * | 7/1990 | Imamura et al. | 384/537 |
| 5,166,565 A | * | 11/1992 | Katsuzawa et al. | 310/90 |
| 5,831,360 A | * | 11/1998 | Senjo et al. | 310/80 |
| 6,089,536 A | * | 7/2000 | Watanabe et al. | 251/129.11 |
| 6,157,103 A | * | 12/2000 | Ohta et al. | 310/49 R |
| 6,365,994 B1 | * | 4/2002 | Watanabe et al. | 310/49 R |
| 2001/0002546 A1 | * | 6/2001 | Miyoshi et al. | 72/104 |
| 2005/0082918 A1 | * | 4/2005 | Hirt et al. | 310/43 |

FOREIGN PATENT DOCUMENTS

| | | | |
|---|---|---|---|
| JP | 10-82349 A | | 3/1998 |
| JP | 11-252891 A | | 9/1999 |
| JP | 2002-347631 | * | 4/2002 |
| JP | 2002-347631 A | | 12/2002 |

* cited by examiner

*Primary Examiner*—Quyen Leung
*Assistant Examiner*—Naishadh N Desai
(74) *Attorney, Agent, or Firm*—Birch, Stewart, Kolasch & Birch, LLP

(57) ABSTRACT

A metallic member 22 is integrated with a molded rotor 12, and a bearing 16 is held to the rotor 12 through this metallic member 22. At that time, a washer 24 is secured to the metallic member, and the rotating portion of the bearing is held by this washer, thereby improving holding property and durability of the bearing. A stopper plate 21 for limiting the displacement of the output shaft of a motor is used as the metallic member, thereby enabling holding property and durability of the bearing to increase without increasing the number of components. The base-end side of the metallic member 22 is integrally in-mold molded with the rotor 12, which enables the metallic member 22 to be firmly held.

12 Claims, 6 Drawing Sheets

BEARING HOLDING STRUCTURE FOR MOTOR

TECHNICAL FIELD

The present invention relates to a bearing holding structure for a motor driving an electric control valve.

BACKGROUND ART

Conventional motor-bearing holding structures that rotatably hold, on the bearing, the rotor of a motor driving an electric control valve include an example in which "The rotor portion of a motor driving the EGR (exhaust gas recirculation) valve of an internal combustion engine is integrally molded with a magnet, a ball bearing, and a resin-made magnet holder supporting these parts by means of insert-molding" (For example, see JP-A-10-082349).

To be more specific, the bearing holding structure is a structure in which part of the magnet holder constituting the rotor protrudes in a sword-guard shape to support the inner ring of the bearing holding the rotor.

However, such a bearing holding structure can have only holding strength obtained with the resin for the bearing holding strength, and is unsatisfactory in terms of reliability and durability. Particularly, in a high-power motor driving an electric control valve, the output power of the motor is transmitted from the output shaft thereof to the bearing inner-ring holding part through the rotor to damage the resin securing the bearing inner-ring, thereby causing the maloperation of the motor.

Patent Reference 1: JP-A-10-082349

In the conventional motor-bearing holding structure, there is a problem that the structure can have only holding-strength obtained with the resin for the bearing holding strength, and the structure, therefore, has low reliability and durability.

The present invention has been accomplished to solve the above-mentioned problem. An object of the present invention is to provide a motor-bearing holding structure with improved reliability and durability.

DISCLOSURE OF THE INVENTION

The motor-bearing holding structure according to the present invention is a structure in which the bearing is held to a rotor through a metallic member that is integrally molded with the rotor.

Further, the motor-bearing holding structure according to the present invention is a structure in which the bearing is held to a rotor through a metallic member that is integrally molded with the rotor such that the travel of a motor shaft which reciprocates in an axial direction is limited.

In such a way, because it is arranged that the bearing be held by the metallic member thereby having holding force that is greater than the holding strength obtained by the resin, reliability and durability of the rotor bearing portion can be improved.

Furthermore, it is arranged that the bearing be held by using the metallic member limiting the travel of the motor shaft, thereby enabling the bearing to be firmly held without increasing the number of components.

BEST MODE FOR CARRYING OUT THE INVENTION

An embodiment of the present invention will now be described by reference to the drawings in order to make description in further detail of the present invention.

Embodiment 1

Figure 1:
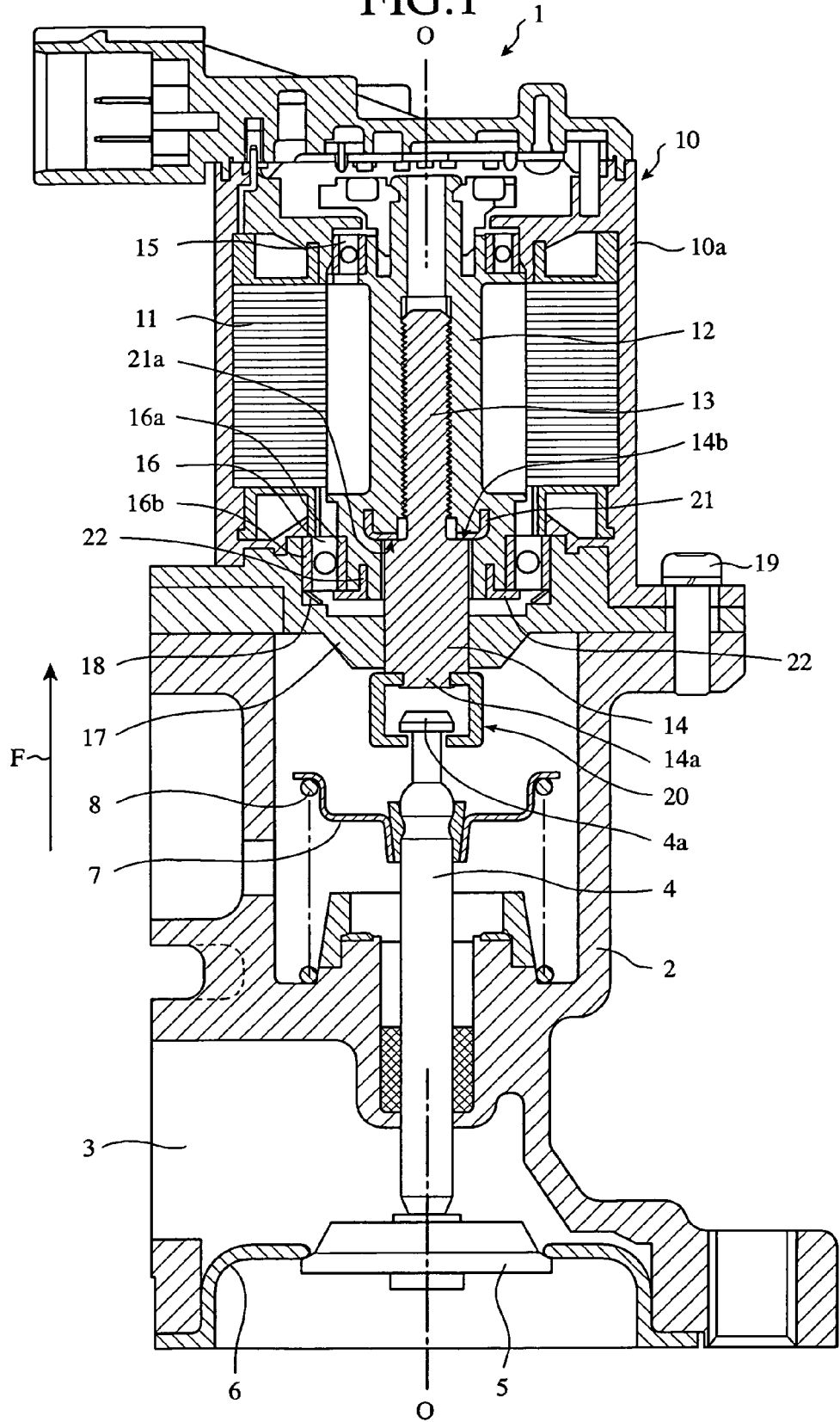
FIG. 1 is a sectional view showing the whole configuration of an electric control valve.
Figure 2:
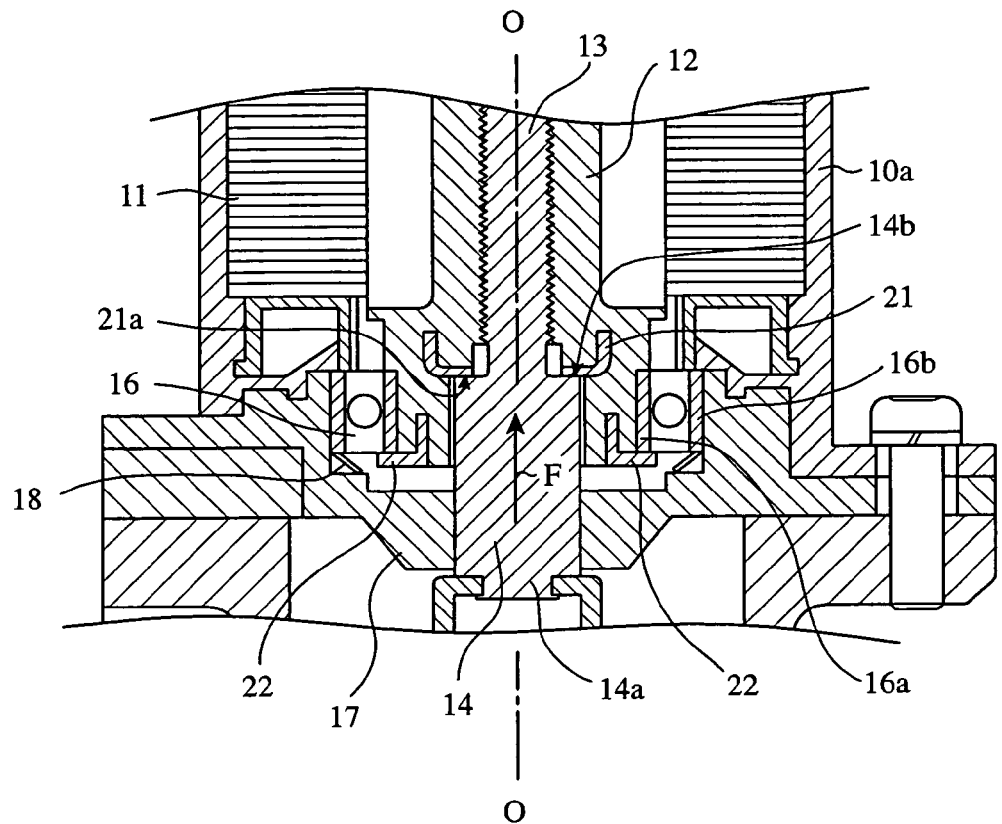
FIG. 2 is an enlarged sectional view showing the vicinity of the lower bearing portion of the electric control valve shown in FIG. 1.

FIG. 1 is a sectional view of an EGR valve device, showing an electric control valve equipped with a motor-bearing holding structure according to Embodiment 1 of the present invention. FIG. 2 is an enlarged view showing the bearing portion thereof. The embodiment will be described referring to these drawings.

The EGR valve device 1 shown in FIG. 1 has a valve housing 2 that forms a fluid channel (exhaust gas recirculating passage) 3 through which the exhaust gas from an engine is circulated. This valve housing 2 is axially movably equipped with a valve rod 4. The valve rod 4 has a valve 5 that can make contact with and separate from a valve sheet 6 installed within the valve housing 2. The valve rod 4 is upwardly energized (in a valve-closing direction) by a spring 8 interposed between a spring holder 7, which is integrally fitted around the rod, and the bottom wall of the external concavity of the valve housing 2. Further, the valve rod 4 integrally has a head 4a.

In addition, the valve housing 2 is externally equipped with an electric control motor 10 used for axially driving the valve rod 4. This electric control motor 10 is arranged to include: a coil 11 serving as a stator; a rotor 12 placed within this coil 11; and a motor shaft 14 serving as a motor output shaft, which has, on the one-end side, a screw rod 13 screwed into the central bore of this rotor 12 and can axially travel. The electric control motor can be applied by the one of the type capable of housing the screw rod 13. Examples of the electric control motor include a DC motor and a step motor. The valve used in this example requires high power, and therefore, a DC motor is mainly used. The rotor 12 is rotatably and axially movably over a defined range held by upper and lower bearings 15 and 16.

In this case, the external wheel 16b of the lower bearing 16 of the rotor 12 is pressurized and axially elastically movably held by a washer 18 interposed between the wheel and a boss (suppressing member) 17 fitted around the bottom opening of the motor housing 10a of the electric control motor 10. The boss 17 is sandwiched between the top end of the valve housing 2 and the motor housing 10a, and these motor housing 10a, boss 17, and valve housing 2 are integrally fastened and secured by a fastening bolt 19.

It is arranged that the inner wheel 16a of the bearing 16 integrate a portion of a metallic member 22, which is the holding means according to the present invention, to the rotor 12, and the bearing be held through this metallic member 22. The metallic member 22 in the example shown in the drawing is formed of a bent piece, which is bent in an L shape; the base-end side of the member is integrated within the rotor 12; and the end of the other-end side is caulked and caused to abut the inner wheel 16a. Thus, because the inner wheel 16a of the bearing 16 is held by using the metallic member 22 having holding force that is greater than the holding strength obtained by the resin, reliability and durability of the rotor-bearing portion can be improved.

The metallic member 22 is arranged to hold the rotating portion of the bearing, that is, the inner wheel 16a, at two or more places at equally spaced intervals around the rotary central axis O-O of the rotor 12. Thus, the stable bearing holding can be performed, resulting in improving reliability of the bearing holding. FIG. 1 and FIG. 2 are sectional views, and therefore, the two metallic members 22 are shown at the right and left two places, respectively, therein; however, the inner wheel 16a is held at four places at 90 degree intervals about the rotary central axis O-O. Of course, the inner wheel can be held at two, three, or six places. The number of the holding places can be optionally determined as the need arises.

The base-end side of the metallic member 22 is integrated within the rotor 12. Any one of bonding, screwing, or engaging is applicable to such an integration means; however, in this embodiment, the base-end side thereof is integrally molded within the rotor 12. The molding thereof enables the base-end side to be easily and firmly integrated within the rotor 12.

In the conventional art, when performing the insert-molding of the bearing into the rotor 12, a process by which no small performance-deterioration is caused is employed. For example, when the bearing is held in the insert-molding process, it is necessary that the bearing should be set in a high-temperature metal mold in the working process. Therefore, there may be an apprehension of viscosity reduction of the grease within the bearing. However, according to Embodiment 1 of the invention, the bearing (inner wheel 16a) is held to the rotor by the metallic member 22, thereby eliminating the necessity of insert-molding the bearing to the rotor 12. Therefore, there is no lowered viscosity of the grease within the bearing.

Moreover, in the conventional art, when the bearing is insert-molded to the rotor, contrivance and consideration to hold the bearing without wobbles are required, which makes the assembly process (manufacturing method) complex and difficult. For example, holding of the bearing by means of insert-molding needs to fix the bearing within the mold when performing the molding. When the fixing load is large, the bearing is deformed to deteriorate its performance. The prevention measures for this were necessary. However, according to Embodiment 1 of the invention, the bearing (inner wheel 16a) is held to the rotor by the metallic member 22. This eliminates the necessity of such consideration and makes easy the assembly work.

The bottom of the motor shaft 14 (portion jointed with the valve rod 4) is integrally provided with a protrusion 14a for caulking. This protrusion 14a is connected with the valve rod 4 through a plate 20. The screw rod 13 is a male screw, and the rod is screwed into the female screw provided around the central bore of the rotor 12. The lower part of the screw rod 13 is the motor shaft 14 having a diameter that is larger than that of the screw rod 13, and such a difference in diameter forms a step portion 14b.

Around the bottom portion of the central bore of the rotor 12, a stopper plate 21 formed of metal in a ring shape is integrally molded with the rotor 12. The stopper plate 21 forms a circular exposed abutting face 21a within a large diameter hole communicating to the central bore of the rotor 12. The step portion 14b can make contact with and separate from this circular exposed abutting face 21a (see enlarged view of FIG. 2). FIG. 1 and FIG. 2 show the state where the step portion 14b abuts the exposed abutting face 21a. The motor shaft 14 penetrates the boss 17; however, the shaft is supported by using a supporting means, which can axially travel or displace through this penetrating portion but cannot rotate therethrough, for example, a D-type fit, a key, or a suitable means.

The basic operation of the EGR valve device 1 shown in FIG. 1 will be described as below.

In FIG. 1, when the step portion 14b abuts the circular exposed abutting face 21a, the valve 5 is seated on the valve seat by the elasticity of the expanding spring 8, and the head 4a and the to-be-caulked protrusion 14a are separated from each other within the plate 20 to ensure seating of the valve 5. The electric control motor 10 is driven, and then the rotor 12 is rotated in a predetermined direction. Thus, the rotational motion of the rotor 12 is transformed to the downward motion of the motor shaft 14, so that the motor shaft 14 can be downwardly traveled. In connection with this, when the step portion 14b got detached from the circular exposed abutting face 21a, and simultaneously, the protrusion 14a for caulking approaches the head 4a to finally abut against the head. Thereafter, the elastic force of the spring 8 acts on the motor shaft 14, and the elastic force is transferred to the rotor 12 through the screw rod 13, thereby the rotor receiving the upward elastic force. The rotation of the rotor 12 downwardly pushes the valve rod 4 against the elastic force of the spring 8 to open the valve 5. The opening of the valve 5 is controlled by the amount of rotation of the electric control motor 10.

When the valve 5 is closed, the rotor 12 is reversely rotated, then the motor shaft 14 is upwardly traveled or displaced, and the valve rod 4 is upwardly traveled according to the amount of travel of the motor shaft. Before long, when the valve 5 is seated on the valve seat 6, thereafter the elastic force of the spring 8 is received by the valve 5 having seated thereon, thereby the valve rod 4 ceases its upward travel, the to-be-caulked protrusion 14a gets upwardly detached from the head 4a, and after the step portion 14b abuts against the circular exposed abutting face 21a, the rotation of the rotor 12 is stopped. Thus, when the step portion 14b abuts against the exposed circular abutting face 21a after the valve 5 is seated thereon, the maximum pulling-in position of the motor shaft 14 is restricted to secure the seating of the valve.

As is understood from the basic operation of the aforementioned EGR valve device 1, because the rotor 12 repeatedly receives the upward elastic force F from the spring 8, the portion of the metallic member 22 according to the invention which engages against the inner wheel 16a is also acted upon by the repeated stress by this elastic force, and the portion thereof is under severe conditions. However, as compared with the arrangement in which the bearing is held by the molding resin integrated with the rotor as in the conventional structure, the present invention can improve reliability of the bearing holding structure by holding the bearing by use of the metallic member with high strength.

Embodiment 2

Figure 3:
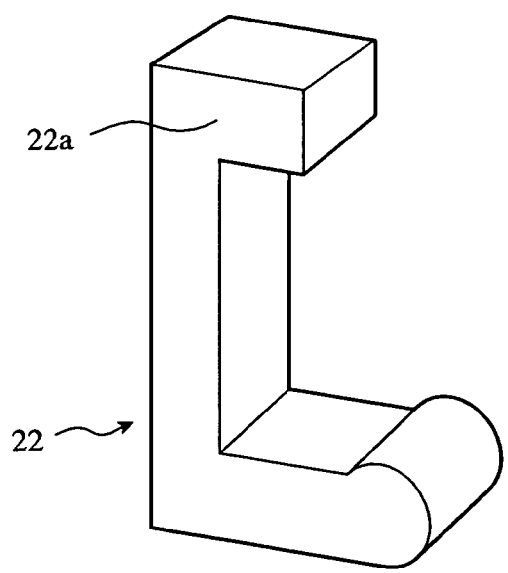
FIG. 3 is a perspective view illustrating a metallic member.
Figure 4:
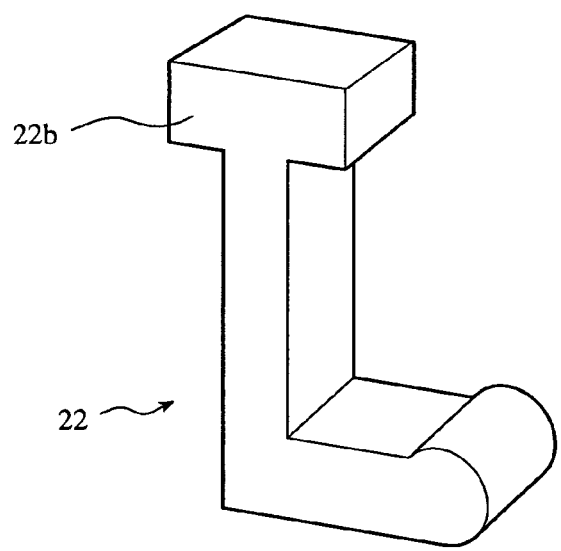
FIG. 4 is a perspective view illustrating a metallic member.

In the metallic member 22 shown in FIG. 2, described in Embodiment 1, the base-end side thereof, inserted within the rotor 12, is straight. Therefore, depending on the conditions where the invention is carried into effect, the holding of the inner wheel 16a may become unstable by the elastic force F in the direction pulled out from the rotor 12. For this reason, in Embodiment 2, the base-end side of the metallic member 22 is bent to form a convexity 22a in an L-shape as shown in FIG. 3, or the same side of the metallic member 22 is bent to form a convexity 22b in a T-shape as shown in FIG. 4. Thereby, the integration function of the metallic member 22 to the rotor 12 improves, enhancing durability and reliability of the bearing. Embodiment 2 has all the structural advantages in Embodiment 1 in addition to this improvement.

Embodiment 3

The top of the metallic member 22 explained in Embodiments 1 and 2 described above is directly caulked to be abutted on the inner wheel 16a, thereby holding the metallic member. However, such a caulking process may damage the bearing if the work is not considerably carefully performed. Further, it is also considered difficult for the plurality of metallic members 22 to hold the inner wheel 16a with a uniform abutting force. Hence, in Embodiment 3, it is arranged that a washer be fixed to the metallic members, and the rotating portion (the inner wheel 16a) of the bearing be held with this washer.

Figure 5:
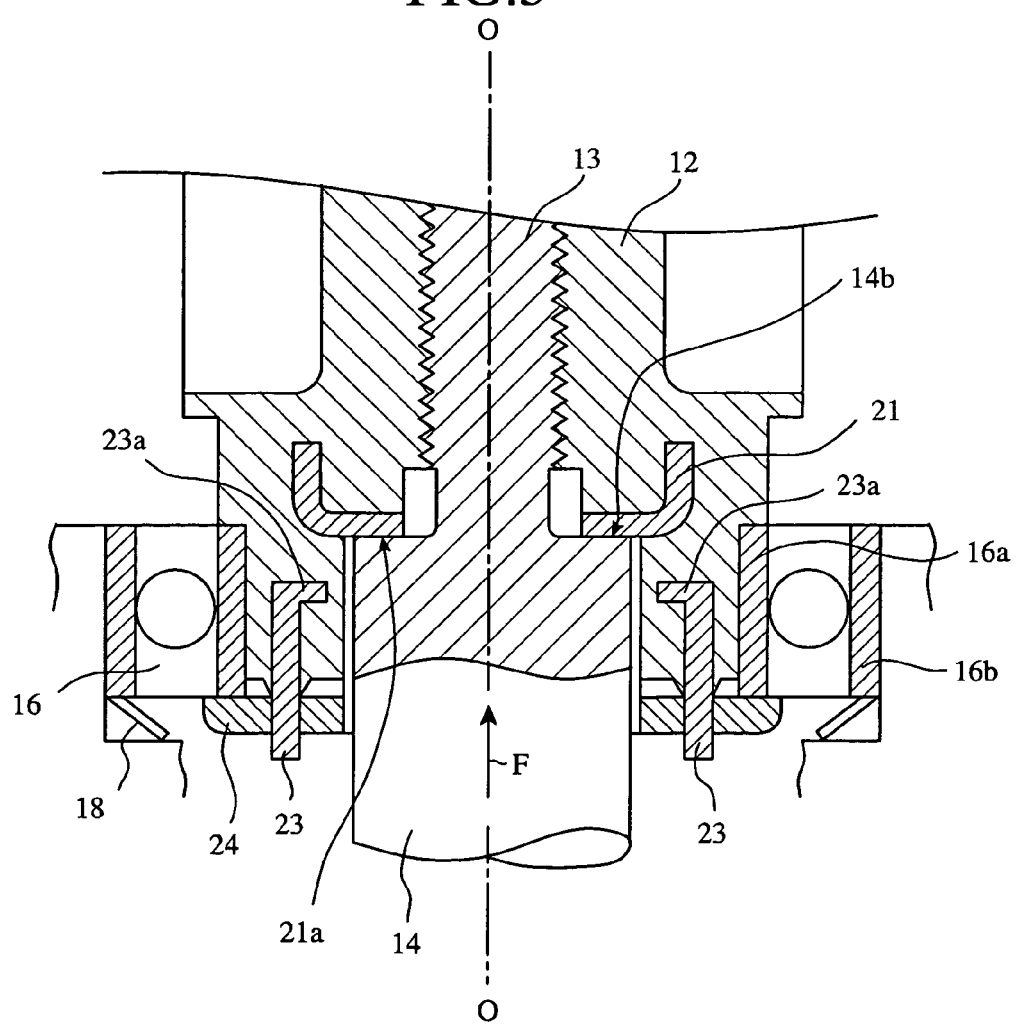
FIG. 5 is an enlarged sectional view showing the vicinity of the lower bearing portion of the electric control valve.

In FIG. 5, in accordance with the invention of Embodiment 3, just like the metallic member 22 in Embodiments 1 and 2 described above, the metallic member 23 is integrally in-mold molded with the rotor 12 with the base-end side thereof (upper top end in the drawing) placed within the rotor. The base-end side thereof is formed into an L-shaped convexity 23a, as described by reference to FIG. 3 in Embodiment 2, thereby strengthening the integration with the rotor 12, and enabling the metallic member to endure the elastic force F. Moreover, in consideration of the installation of the washer in terms of shape, the bottom side of the metallic member 23 is arranged to be protruded below the rotor 12.

The metallic members 23 are provided at two or more places at equally spaced intervals around the rotary central axis O-O of the rotor 12. The washer 24 is provided in such a size that its external diameter is superimposed on the inner wheel 16a, and also is provided in the central portion with a hole made of such a size that the motor shaft 14 can be penetrated. Furthermore, the washer is provided with holes that allow the metallic members 23 to be penetrated at a position corresponding to each of the metallic members 23 provided at the plurality of places, respectively.

As shown in FIG. 5, the holes formed through the washer 24 are penetrated by the motor shaft 14 and the metallic members 23, respectively, and the washer 24 is pressed to be abutted against the inner wheel 16a with a uniform force. At that time, the bottom portion of each of the metallic members 23 penetrates the washer 24, and downwardly protrudes therefrom. The metallic members 23 downwardly protruding therefrom and the washer 24 are secured to each other by welding or caulking.

Thus, in the structure holding the inner wheel 16a with the washer 24, placing a uniform load on the inner wheel 16a to hold the wheel is easy, thereby not damaging the reliability of the bearing. As compared with the structures of Embodiments 1 and 2 in which the inner wheel is directly held by caulking the metallic member 22, the structure of Embodiment 3 has less influence on the inner wheel 16a. Further, the application of material and size having required holding strength to the structure thereof can eliminate the damage to the bearing, and enhance the reliability and durability of the bearing. If the number of the metallic members 23 is two, this Embodiment employing the washer 24 is unstable. The number thereof is preferably three or more.

When compared to the structure in which the inner wheel 16a is directly held by each of the plurality of metallic members, as in Embodiments 1 and 2, the structure in which the washer 24 is used has the property of stably holding the inner wheel 16a also in the mass production process. In other words, interposing the washer 24 therebetween substantially prevents the influence caused by the holding of the washer 24 to the metallic members 23 by caulking or welding from extending to the bearing, thereby reducing the influence exerted upon the accuracy of the bearing.

Figure 6:
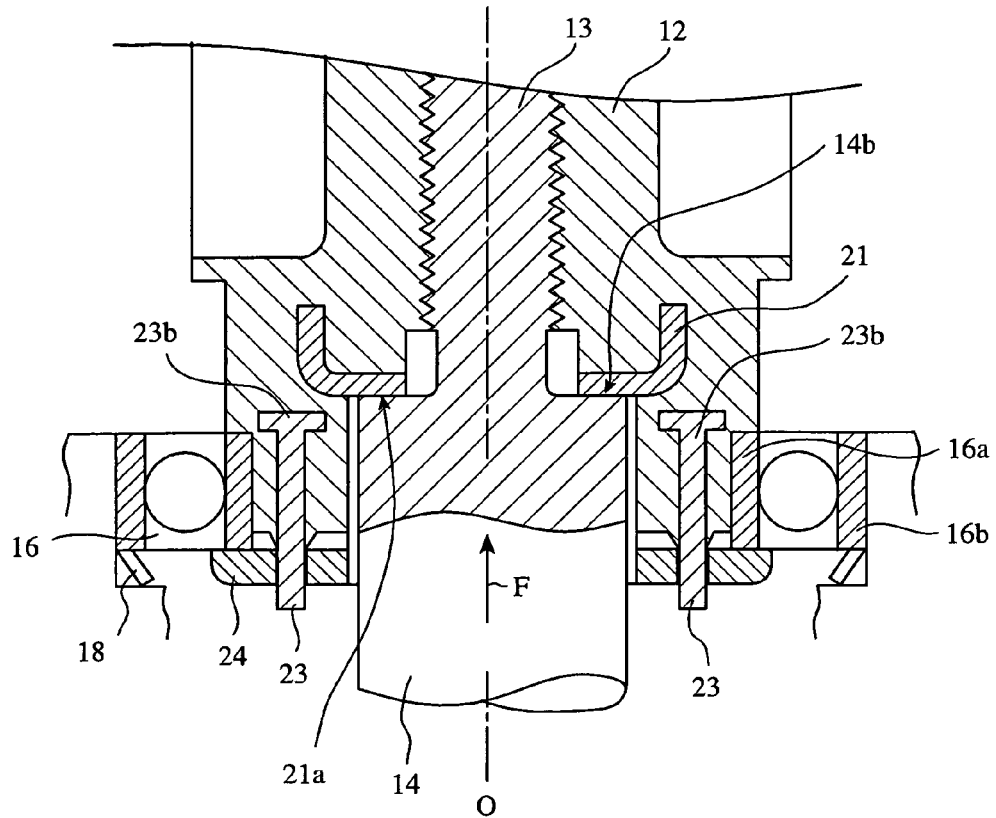
FIG. 6 is an enlarged sectional view showing the vicinity of the lower bearing portion of the electric control valve.

The example shown in FIG. 6 is a modification of this Embodiment 3 described by reference to FIG. 5. The difference between this example and the example shown in FIG. 5 is only that the base-end side of the metallic member 23 (top portion in the drawing) has a convexity 23b in a T-shape, and they have substantially equal property except that. Embodiment 3 also has all the advantages described in Embodiment 1.

Embodiment 4

Known rotors for a motor driving an electric control valve include a rotor that is equipped with a stopper plate 21 that abuts on a motor output shaft reciprocating according to the rotation of this rotor to open and close the valve, thereby limits the travel of the motor output shaft, and restricts the maximum pulling-in position of the motor output shaft. This Embodiment 4 can be applied to this type of electric control valve provided with such a stopper plate 21. Embodiment 4 will be described below as compared with Embodiment 3 described above. Embodiment 3 is provided with the metallic members 23 separately from the stopper plate 21 as shown in FIG. 5 and FIG. 6. As contrasted to this, as shown in FIG. 7, in this Embodiment 4, is provided an integrated member 25 obtained by integrating the stopper plate 21 and the metallic member 23, in place of the stopper plate 21 and the metallic members 23 employed in the examples described above.

This integrated metallic member 25 has a bottom 26 forming the exposed abutting face 21a, a retaining portion 27, which functions to prevent the member from falling out, and a holding plate 28 holding the washer 30, and the integrated metallic member is formed in a ring shape. In the center of the member, is provided a hole 29. This hole 29 is larger than the diameter of the screw rod 13, and is smaller than the diameter of the motor shaft 14. The exposed abutting face 21a is provided on the circumference or edge of the hole 29.

Figure 8:
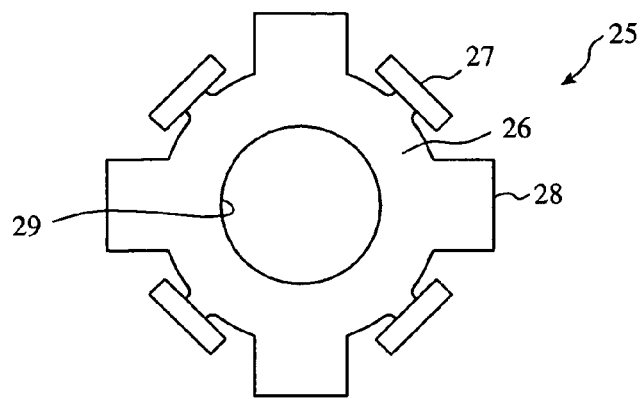
FIG. 8 is a plan view showing an integrated metallic member.
Figure 9:
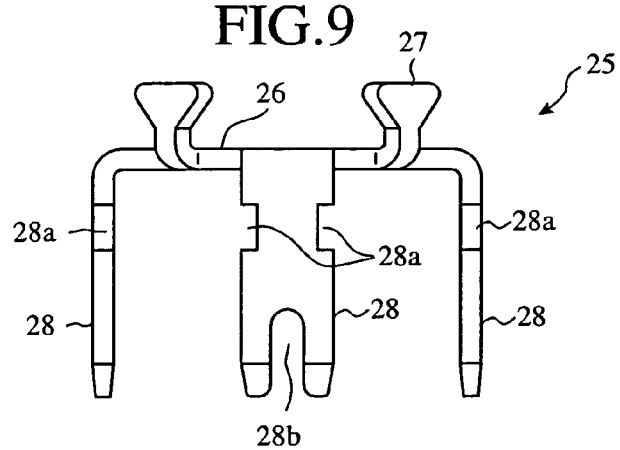
FIG. 9 is a front view showing the integrated metallic member.
Figure 10:
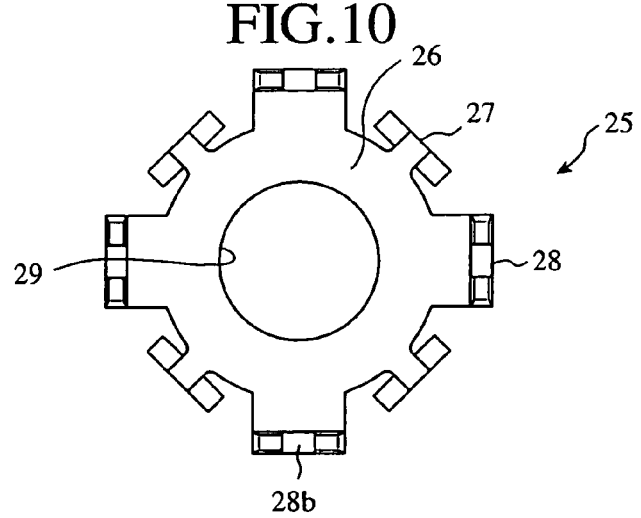
FIG. 10 is a bottom plan view showing the integrated metallic member.

As seen from the above, front and below, the shapes of this integrated metallic member 25 are shown in FIG. 8, FIG. 9, and FIG. 10, respectively. In these drawings, the retaining portion 27, which is molded and integrated within the rotor 12 and projects in a direction parallel to the elastic force F, has a top portion formed in inverted triangular shape; and the holding plate 28 is provided with a convex and concave portion 28a, thereby enabling firm integration by resin wrap-around in the molding integration. The bottom of the holding plate 28 is provided with a U-shaped groove 28b, thereby bifurcating the bottom.

Figure 7:
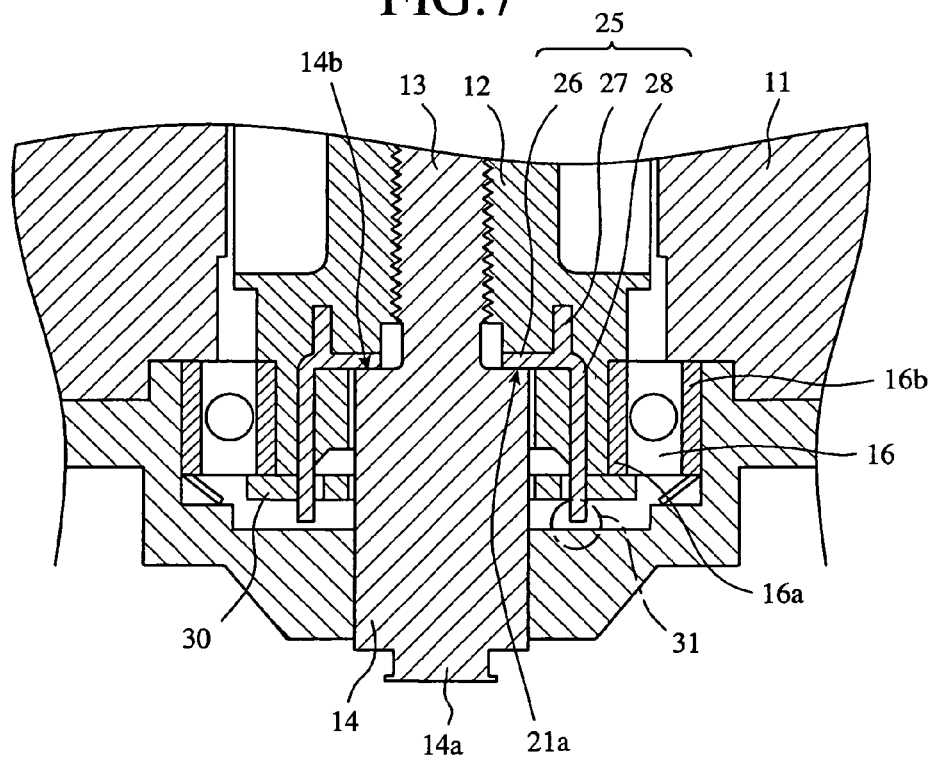
FIG. 7 is an enlarged sectional view showing the vicinity of the lower bearing portion of the electric control valve.

As shown in FIG. 7, the integrated metallic member 25 is provided as follows: the central axis thereof is aligned with that of the rotor 12; the exposed abutting face 21a, which is an internally contacting face of the bottom 26 and which is in the vicinity of the edge of the hole 29 is exposed from the rotor 12; and the retaining portion 27 and the base-end side of the holding plate 28 are positioned within the rotor 12 and integrated by molding.

Figure 11:
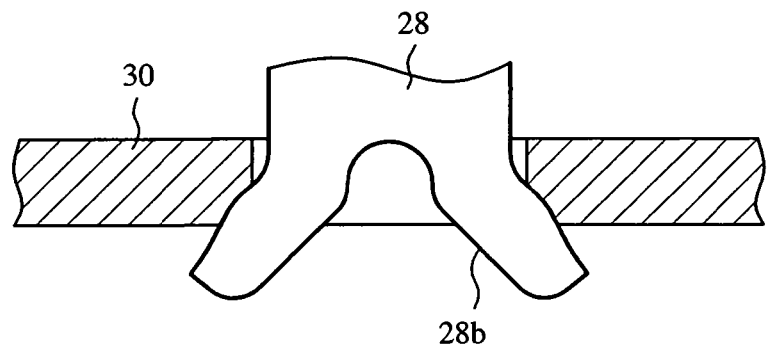
FIG. 11 is a fragmentary sectional view showing the cross section of a washer held by the integrated metallic member.

A washer 30 having a structure basically similar to the washer 24 shown in FIG. 5 and FIG. 6 in Embodiment 3 is held and secured to the holding plates 28 in a condition where the washer is penetrated by the holding plates 28 through holes formed at equally spaced intervals concentrically with the hole 29 and further where the outer peripheral edge of this washer 30 comes in contact with the inner wheel 16a. The fastening procedure of this washer 30 is as follows: the optional opposed holding plates 28 are temporarily welded to the washer 30 at the portions bifurcated by the grooves 28b at the places penetrating the washer 30, and further, the bottoms of the remaining holding plates 28 are caulked to secure the washer. As the state after caulking is shown in FIG. 7 in which the indicated portion 31 indicated by circling in FIG. 11 is enlarged, each of the two legs bifurcated by the groove 28b is transformed in an opening direction and thereby caulked to secure the washer.

As compared with the securing methods by caulking and by welding, the method by welding may gives a higher strength. However, if the washer 30 is not fixed while being pressed against the inner wheel 16a at the time of fixing the washer, there may be a possibility that wobbles take place due to the contact failure. In order to prevent this trouble, the holding plates are not welded at all point, but the plates are fixed by welding at several points. By using the welded places as the supporting points, the remaining places are caulked to thereby be pressed against the inner wheel 16a, thereby holding the inner wheel 16a at the equally spaced positions in the inner wheel 16a through the washer 30. After that, when the caulked portions are also welded, the strength is secured.

Thus, the welding method and the caulking method are used to fix the holding plates at the plurality of places. The washer 30 is held by using the caulked portion directed toward preventing the bearing from wobbling and the welded portion directed toward improving the holding strength. Thereby, the occurrence of the wobble at the time of assembling the bearing is prevented, and the holding strength is improved, enabling reliability and durability of the electric control valve to improve.

Figure 12:
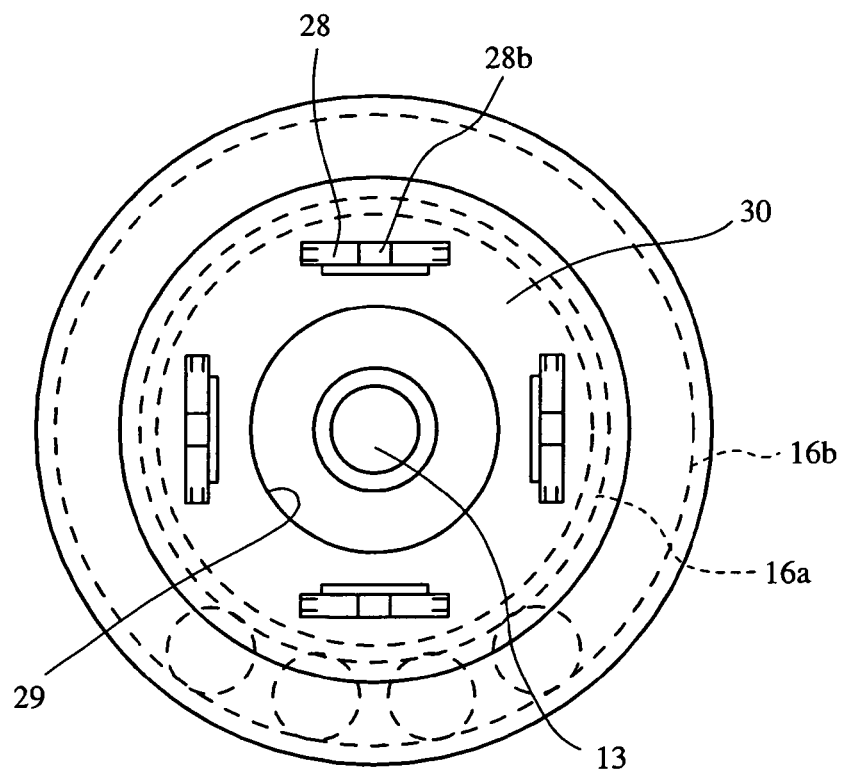
FIG. 12 is a bottom plan view showing the washer held by the integrated metallic member.

The arrangement in which the washer 30 is held by the holding plates 28, that was shown in FIG. 7, is also shown in FIG. 12, the arrangement being seen from under. In FIG. 7, the four caulked portions in the holding plates 28 can been seen in the vicinity of the hole 29. The bearing 16 is shown with the circular outline along the external edge of the washer 30. The area shown with the double dashed line corresponds to the inner wheel 16a.

Conventionally, the stopper plate 21 has been only insert-molded into the rotor 12, and the plate has not had the function of increasing its holding strength, accordingly causing the problem of dropping off and being damaged. However, as described in Embodiment 4, the stopper plate 21 is integrated with the metallic member (the metallic members 22 and 23 in Embodiments 1-3) used for holding the inner wheel 16a, to form the integrated metallic member 25, thereby enabling also the accuracy of the plurality of holding plates 28 to increase without increasing the number of components. Moreover, the sections inserted in the rotor 12 increase to strengthen the integration with the rotor 12, thereby enhancing the integration of each of the members of the functioning portion serving as the stopper plate and of the functioning portion serving as the metallic member, with the rotors 12. Embodiment 4 also has all the advantages described in Embodiment 1 in addition to the advantages described here. As a result, the performance of the electric control valve can be stably secured for a long term.

INDUSTRIAL APPLICABILITY

The present invention is suitable for use in the motor-bearing holding structure that drives the EGR (exhaust gas recirculation) valve of an internal combustion engine.

The invention claimed is:

1. A motor-bearing holding structure comprising:
    a molded rotor;
    a metallic member having a first end portion and a second end portion, wherein the first end portion is integrally molded with the rotor; and
    a first bearing having an inner wheel and an external wheel,
    wherein the second end portion of the metallic member is rotatably held to the inner wheel at two or more places at equally spaced intervals around a rotary central axis of the molded rotor,
    wherein the metallic member is a plurality of metallic members each including a washer that is fixed to corresponding metallic member, and
    wherein the plurality of metallic members are provided at plurality of places at equally spaced intervals around the rotary central axis of the molded rotor and the washer includes holes that allow the metallic members to be penetrated at a position corresponding to each of the metallic members provided at the plurality of places.

2. The motor-bearing holding structure of claim 1 further comprising:
    a motor shaft that reciprocates in an axial direction by the rotation of an in-mold molded rotor;
    wherein the metallic member that is integrally molded with the rotor abuts this motor shaft against said metallic member to limit the displacement of the motor shaft.

3. A motor-bearing holding structure according to claim 1, wherein a washer that is fitted to the external wheel of the first bearing protruding from the rotor is secured to the metallic member under conditions where the washer is pressed against the bearing.

4. A motor-bearing holding structure according to claim 1, wherein the molded part of the metallic member is provided with a convex and concave portion.

5. A motor-bearing holding structure according to claim 1, further comprising a stopper plate that is integrally molded with the metallic member.

6. A motor-bearing holding structure according to claim 1, wherein the metallic member is formed of a bent piece, which is bent substantially in an L-shape.

7. A motor-bearing holding structure according to claim 1, further comprising a second bearing wherein the molded rotor is rotatably and axially movable over a predefined range held by the first and second bearings.

8. A motor-bearing holding structure according to claim 5, wherein the stopper plate forms a circular exposed abutting face within a large diameter hole communicating to the central bore portion of the molded rotor.

9. A motor-bearing holding structure according to claim 4, wherein the convex portion is formed of a bent piece, which is bent substantially in an L-shape.

10. A motor-bearing holding structure according to claim 4, wherein the convex portion is formed of a bent piece, which is bent substantially in a T-shape.

11. A motor-bearing holding structure according to claim 1, wherein external diameter of the washer is superimposed on the inner wheel so the washer can be pressed to be abutted against the inner wheel with a uniform force.

12. A motor-bearing holding structure according to claim 1, wherein metallic member is a ring-shape metallic member.

* * * * *